United States Patent Office 3,498,956
Patented Mar. 3, 1970

3,498,956
STABLE SOLID POLYMERIZABLE LACTAM-CATA-LYST-COCATALYST MIXTURES AND METHODS OF PREPARING THE SAME
Helmut Birkner, Marl, Germany, assignor to Chemische Werke Huls Aktiengesellschaft, Marl, Germany
No Drawing. Filed Oct. 14, 1966, Ser. No. 586,620
Claims priority, application Germany, Nov. 17 1965, C 37,422
Int. Cl. C08g 20/18, 20/10
U.S. Cl. 260—78                                   9 Claims

ABSTRACT OF THE DISCLOSURE

This invention relates generally to stable mixtures and methods of preparing solid polymerizable lactam-catalyst-cocatalyst compositions and relates particularly to particulate mixtures and methods of preparing solid polymerizable lactam-catalyst-cocatalyst compositions which are sufficiently stable to storage and transportation at temperatures below 50° C. and polymerize at higher temperatures.

In a specific embodiment of the present invention, the polymerizable composition is stable under 50° C. and comprises a particulate mixture of:
 (a) A lactam;
 (b) A latent catalyst or a mixture thereof with a lactam; and
 (c) A cocatalyst or a mixture thereof with a lactam; wherein the concentration of (b) and (c) amounts to 0.01 to 5 mole percent and preferably 0.1 to 2 mole percent of the total mixture, and the latent catalyst comprises neutral or slightly basic salts which react at polymerization temperature, e.g. at 200° C., with lactams to form metal lactamates with the separation of protons.

In preparing the particulate mixture the individual components of lactam, catalyst and cocatalyst are pulverized and mixed at a temperature below 50° C., preferably with the exclusion of moisture.

CROSS-REFERENCE TO RELATED APPLICATIONS

Applicant claims priority under 35 U.S.C. 119 for German application C 37,422, filed Nov. 17, 1965.

The present application is an improvement over U.S. patent application Ser. No. 455,051, of Birkner et al., filed May 10, 1965 (now abandoned), the disclosure of which is incorporated herein.

BACKGROUND OF THE INVENTION

While the polymerization of lactams is well known, various problems exist depending upon the uses to which the polymers are to be put. For some purposes, for example, it is desirable to have available mixtures which are readily polymerizable merely by the application of heat and which can be stored and transported prior to polymerization.

It has previously been known that lactams can be polymerized either hydrolytically or anionically in the presence of basic catalysts. The anionic polymerization can be effected at lower temperatures than the hydrolytic polymerization, but passes through a characteristic induction period. This induction period can be completely eliminated by the addition of cocatalysts which also serve to increase markedly the reaction velocity, as well as lower the temperature required for effecting the polymerization. Cocatalysts suitable for this purpose include, for example, acyl lactams, alkyl sulfonyl lactams, aryl sulfonyl lactams, isocyanates, carbodimides, and chemically active carboxylic acid derivaties, such as acid anhydrides, acid chlorides or carboxylic acid esters.

It has been found that by combining two lactam melts, one of which contains the catalyst and the other the cocatalyst, a polymer is quickly produced at higher temperatures. With beta-lactams that temperature is approximately 20° C., and with caprolactams at least 130–140° C. The lactam melt which contains the cocatalyst has almost unlimited stability at the temperatures mentioned, whereas the melt containing the catalyst has only a short life, depending upon the temperature.

In addition to the limited stability of the catalyst-containing melt, the use of lactams with high melting points involves certain technical difficulties.

Attempts have been made to add the cocatalyst to a catalyst-containing melt at, for example, lower temperatures and then to solidify the molten mixtures by cooling it, the resulting granulated mixture being then delivered to an extruder for polymerization therein. Such a process, however, can only be used with lactams having relatively low melting points, that is, with lactams having molecular weights up to about that of capryl lactam, which has a melting point of 72–73° C.

Lactams having melting points about 100° C. undergo partial polymerization during the preparation of the lactam-catalyst-cocatalyst mixture, and hence unless such a mixture is immediately subjected to further treatment it will not be possible to produce therefrom a highly polymerized product.

The advancement made in the state of the art by application Ser. No. 455,051 comprises a particulate mixture of:
 (a) A lactam;
 (b) A catalyst comprising the alkali metal salts of lactams such as, for example, the lithium, sodium and potassium lactamates, as well as the corresponding salts of magnesium and aluminum; and
 (c) A cocatalyst comprising lactams carrying an electron-attracting substituent on the nitrogen atom, as for example, N-acyl lactams, N-(alkylsulfonyl- or aryl-sulfonyl)-lactams, or other such substances capable of reacting with lactams to form the N-substituted lactams above mentioned, as for example isocyanates, carbodiimides or reactive acid derivatives, such as acid anhydrides, acid chlorides or carboxylic acid esters.

DESCRIPTION OF THE INVENTION

It is therefore an object of the present invention to provide improved stable mixtures of polymerizable lactam-catalyst-cocatalyst compositions.

Another object of the invention is a stable particulate mixture of a lactam, a catalyst and a cocatalyst which can be polymerized to a lactam polymer by the application of heat.

Still another object of the invention is a stable particulate mixture of a lactam, a catalyst dispersed in a lactam and a cocatalyst dispersed in a lactam which can be polymerized to a lactam polymer by the application of heat.

It is still another object of the invention to provide a stable particulate mixture of a catalyst dispersed in a lactam and a cocatalyst dispersed in a lactam which can be polymerized to the lactam polymer by the application of heat.

A particular object of the invention is the use, along with a cocatalyst, of "latent" catalysts comprising neutral or slightly basic salts which react with lactams to form metal lactamates with the separation of protons at the polymerization temperature.

Further objects and the broad scope of the invention will become obvious from an inspection of the specification, specific examples and claims appended hereto.

The improvement of the present invention over the invention described in application Ser. No. 455,051, filed May 10, 1965, consists of greater storage stability of such polymerizable mixtures. It has been found that the storage stability of such mixtures can be greatly increased by the use of catalysts consisting of neutral or slightly basic salts which at polymerization temperature, e.g. at 200° C., will react with lactams to form metal lactamates with the separation of protons. These new catalysts will be referred to as "latent" catalysts because they get their catalytic activity only under the conditions of polymerization. They must be neutral or slightly alkaline at temperatures below 50° C. at which the polymerizable lactam-containing powders are to be stored. They are salts of volatile weak acids or carboxylated compounds which at polymerization temperatures are converted into strong bases with the liberation of $CO_2$, as for example, alkali or alkaline earth salts of semi-esters of carbonic acid (Formula I), of carboxylated amines and of carboxylated lactams (Formula II), or especially suitable for the use as "latent" catalysts, of decarboxylatable carboxylic acids (Formula III). The following are a few general examples

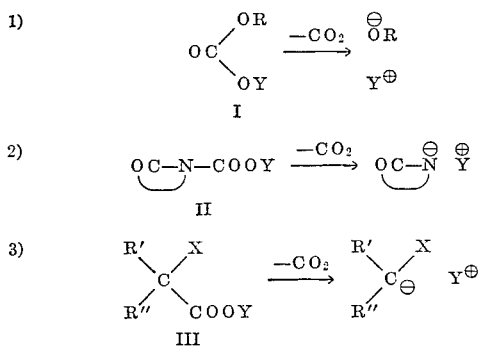

In the formulas (I–III) Y is an alkaline earth or preferably an alkali metal, R is an alkyl, R' and R" are the same or different alkyl or aryl groups or hydrogen and X is a group, as for example aryl, cyano or COOR, which by its electron affinity facilitates the decarboxylation. The alkyl groups can have up to 12 C-atoms. R and R' have no pronounced influence on the effectiveness of the catalytic action, provided they do not contain any halogen groups and are inert to the molten mixture of lactam, catalyst and cocatalyst.

Specific examples of the above identified "latent" catalysts are:

(1) The salts of semi-esters of carbonic acid which are referred to as "masked alcoholates" since they are converted by decarboxylation into alcoholates with the liberation of oxyanions, e.g. sodium ethyl carbonate, potassium methyl carbonate, lithium butyl carbonate, sodium methyl carbonate, potassium ethyl carbonate, sodium butyl carbonate, potassium lauryl carbonate, magnesium ethyl carbonate, (2) Compounds which upon decarboxylation form nitrogeneous anions such as salts of carboxylated lactams and also salts of carboxylated amines, namely salts of carbamic acids, e.g., sodium-N-carboxy-caprolactam, potassium - N - carboxy - aluryl-lactam, sodium-N-phenyl-carbamate, lithium-N-carboxy-lauryllactam, sodium-N-carboxy-lauryllactam, potassium-N-carboxy-caprolactam, (3) Salts of decarboxylatable carboxylic acids by the decarboxylation of which strongly basic carbon anions are produced, e.g. sodium phenyl acetate, sodium cyan acetate, potassium phenyl acetate, potassium diphenyl acetate, sodium diphenyl acetate, potassium α-naphthyl acetate, sodium salt of malonic acid ethyl ester, sodium salt of malonic acid methyl ester, lithium salt of malonic acid methyl ester, potassium salt of malonic acid methyl ester, potassium salt of malonic acid lauryl ester, lithium phenyl acetate.

Finally, the "latent" catalysts can also be considered as including the salts of volatile weak acids, e.g. sodium or potassium cyanide, which at polymerization temperature react with lactam to form the metal lactamates by splitting away the free acid.

The lactam-catalyst mixture is prepared by mixing a lactam and one of the "latent" catalysts in the ratio of 1:1 to 99.99:0.01 (molar ratio), and preferably in the ratio of 4:1 to 99.9:0.1.

The lactam-cocatalyst mixture is produced by reaction of a lactam with the cocatalyst selected in the ratio of 1:1 to 99.99:0.01 (molar ratio), and preferably in the ratio of 4:1 to 99.9:0.1. With the reaction partners in the ratio of 1:1, the undiluted cocatalyst is obtained and can be further purified, if desired.

The lactam-catalyst and the lactac-cocatalyst mixtures can also be produced in an inert water-free solvent, such as for example, benzene, toluene and xylene, the use of such a solvent being especially advantageous in the case of the higher melting lactams.

The cocatalyst can have regulators added to it, if desired, that is, to the lactam cocatalyst mixture. Such regulators consist preferably of acylic amides, such as, for example, acetamide and benzamide.

The lactam-catalyst and the lactam-cocatalyst mixtures the height of the temperature is relatively unimportant.

On account of the danger of having the reaction commence too soon, it is preferable to prepare the concentrates of the "latent" catalysts and lactams by mixing these components in their powdered form below 50° C., and preferably at room temperature, rather than in the molten state. On account of the non-sensitivity of the "latent" catalysts to moisture, it is often unnecessary to take any special precautions to exclude moisture during the preparation and storage of the lactam-catalyst-cocatalyst mixtures, it being generally permissible to work in contact with the open air. It is advisable, however, to remove the air just prior to polymerization to avoid discoloration of the product at the higher temperatures. Another advantage of the use of "latent" catalysts is that the resulting polymers are of lighter color and are produced with fewer by-products.

In this manner higher lactams with 9 to 18 C-atoms and preferably with 10 to 12 C-atoms can be used, and the latter can carry substituents. Suitable higher lactams are capric-, undecyl-, lauryl-lactam, methylene-di-caprolactam, 2-oxo-tetradecamethylene imine, 2-oxo-hexamethylene imine, 2-oxo-octadecamethylene imine.

The lactam-catalyst mixture and the lactam-cocatalyst mixture, produced as above described, are mixed intimately by grinding the two mixtures together, additional lactam being added, if desired. The grinding and mixing are carried out at room temperature (<50° C.), preferably with the exclusion of moisture, as for example, under an atmosphere of nitrogen. The relative amounts of lactam-catalyst mixture and lactam-cocatalyst mixture, and of any additional lactam added, are so chosen that the catalyst and cocatalyst concentrations, which do not need to be equal but are preferably so, amount to 0.01 to 5 molar percent, preferably 0.1 to 2 molar percent, based on the weight of the total reaction mixture.

The polymerization is performed under nitrogen at temperatures between 140 and 300° C., preferably between 180 and 260° C. The conversions are determined by extracting the comminuted polymers with hot methanol.

The polymerized lactams such as lauryllactam are suitable for extrusion into fibers as disclosed in Chemical Abstracts, vol. 60, (1964), p. 3107, and the U.S.S.R. article abstracted therein.

Suitable cocatalysts are lactams which carry an electron-attracting substituent on the nitrogen atom, e.g. N-acyl-lactams, N-(alkylsulfonyl- or aryl-sulfonyl)-lactams or other such substances which are capable of reacting with lactams to form the N-substituted lactams above mentioned, e.g. reactive acid derivatives, isocyanates or carbodiimides, such as N-acetyl-caprolactam, N-benzoyl - caprolactam, N - acetyl - lauryllactam, N - (N'-phenyl - carbamoyl) - caprolactam, N - (N' - phenyl - carbamoyl) - lauryllactam, hexamethylene - 1,6 - bis - (carbamido-caprolactam), hexamethylene - 1,6 - (carbamido-lauryllactam), phenylisocyanate, hexamethylene-1,6 - diisocyanate, triphenyl - cyanurate, dicyclohexyl - carbodiimide, benzoic acid anhydride.

The lactam-catalyst-cocatalyst mixtures which were obtained by the use of the "latent" catalysts of this invention, can be polymerized discontinuously, but especially continuously, e.g. in a screw-fed press. Suitable to use for this purpose is an extruder with one or more degassing zones to permit the removal of volatile components derived from the "latent" catalysts.

The production of these compounds and their use as catalysts for the anionic lactam polymerization are described in the literature (O. Wichterle et al., Chem. Listy. Praha, 52 pages 636–639 (1958)).

It is, however, surprising that the solid lactam-catalyst-cocatalyst mixtures which were obtained by the use of these "latent" catalysts, in contrast to such analogous mixtures as were obtained by the use of ordinary catalysts according to application Ser. No. 455,051, not only have a greatly improved storage stability if air and moisture are excluded, but can also be stored in contact with the air. The technical advantage that is obtained thereby is further illustrated by the following examples.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example A gives a comparative example for the production of a lactam-catalyst-cocatalyst mixture according to application Ser. No. 455,051. The "parts" mentioned therein are parts by weight.

As a measure of the storage stability of the lactam-catalyst-cocatalyst mixtures, use is made of the decrease of their polymerization activity. This can be expressed by the amounts of conversion while the polymerization conditions remain otherwise the same. If such conversion has diminished more for one product than for another after the same storage time, then the former is less storage stable than the latter.

Example A 180 parts dry lauryl lactam, 13 parts (1 mole percent) of a sodium lauryl lactam concentrate in lauryl lactam (0.82 mmole/g.), 2.5 parts (0.8 mole percent) N-(N'-phenyl-carbamoyl)-lauryl-lactam, and 1.0 part (0.1 mole percent) of a hexamethylene-1,6-bis-(carbamido-lauryl-lactam) concentrate in lauryl lactam (1 mmole/g.) are thoroughly mixed 3 to 5 minutes with flushing of dried nitrogen at room temperature (e.g. in a household mixer).

If the polymerization is performed immediately after the mixing, then the conversion, depending on the temperature and lapse of time, will amount to about 98%. If, however, the mixture is first stored four weeks under nitrogen at 0° C., only 75% will be converted, whereas after four weeks storage at room temperature only 57% will be converted, while after one week of storage at 50° C., 80% is converted. If the activated powder is stored in contact with the air, then after only a few hours it can no longer be polymerized.

Example 1

100 parts dry lauryl lactam, 0.45 part (0.5 mole percent) of the potassium salt of malonic acid ethyl ester and 2.75 parts (0.5 mole percent) of an N-(N'-phenyl-carbamoyl)-lactam concentrate in lauryl lactam (0.9 mmole/g.) are thoroughly mixed as in Example A. The conversion after immediate polymerization amounts to 98%, and after two weeks of storage in contact with the air at room temperature still amounts to 97–98%.

Example 2

200 parts dry lauryl lactam, 0.85 part (0.5 mole percent) of the potassium salt of malonic acid monoethyl ester, 1.26 parts (0.4 mole percent) N-(N'-phenyl-carbamoyl)-lauryl lactam, and 2.81 parts (0.05 mole percent) of a concentrated lauryl lactam in 10% by weight of hexamethylene - 1,6 - bis - (carbamido-lauryl lactam) are mixed at room temperature without any protective gas.

Before the polymerization the samples must be de-aerated under vacuum. If polymerization is performed immediately after mixing, the conversion amounts to 97%. After being stored four weeks at 50° C. in contact with the air it amounts to 96%, and after six weeks storage under the same conditions it still amounts to 96%.

Example 3

200 parts dry lauryl lactam, 1.6 parts (1 mole percent) sodium phenyl acetate and 2.4 parts (1 mole percent) N-(N'-phenyl-carbamoyl)-caprolactam are thoroughly mixed as in Example A.

Immediate polymerization results in a conversion of about 94%, which remains about the same after four weeks storage at 50° C. under $N_2$, and after twelve weeks storage at 50° C. under $N_2$ drops to 89%.

Example 4

200 parts dry lauryl lactam are mixed as in Example A with 1.12 parts (1 mole percent) sodium ethyl carbonate and 2.5 parts (0.25 mole percent) of a hexamethylene-1,6-bis-(carbamido-lauryl-lactam) concentrate (1 mmole/g.).

By careful polymerization a yield of about 94% is obtained. After a two week storage at room temperature under nitrogen the yield is 77%, and after a 24 hour storage at 50° C. in contact with the air the yield is still 77%.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:
1. A polymerizable composition of lactam-catalyst-cocatalyst consisting essentially of a mixture of:
    (a) a particulate lactam;
    (b) a particulate latent catalyst consisting essentially of neutral or weakly basic alkaline earth or alkali metal compounds which react with lactams to form metal lactamates at the polymerization temperature wherein said latent catalyst is a member of the group consisting of sodium ethyl carbonate, potassium methyl carbonate, lithium butyl carbonate, sodium methyl carbonate, potassium ethyl carbonate, sodium butyl carbonate, potassium lauryl carbonate, magnesium ethyl carbonate, sodium N-carboxy-caprolactam, potassium N-carboxy lauryllactam, sodium N-phenyl carbamate, lithium N-carboxy lauryllactam, sodium N-carboxy-lauryllactam, potassium N-carboxy-caprolactam, sodium phenyl acetate, sodium cyan acetate, potassium phenyl acetate, potassium diphenyl acetate, sodium diphenyl acetate, potassium α-naphthyl acetate, sodium salt of malonic acid ethyl ester, sodium salt of malonic acid methyl ester, lithium salt of malonic acid methyl ester, potassium salt of malonic acid methyl ester, potassium salt of malonic acid lauryl ester, lithium phenyl acetate, sodium cyanide or potassium cyanide; and (c) a particulate lactam cocatalyst.

2. The composition of claim 1 wherein the catalyst and cocatalyst concentration is between about 0.01 to 5 mole percent based on the total mixture.

3. The composition of claim 1 wherein the catalyst and cocatalyst concentration is between about 0.1 to 2 mole percent based on the total mixture.

4. The composition of claim 1, wherein the cocatalyst is a member of the group consisting of N-acetyl caprolactam, N-benzoyl caprolactam, N-acetyl lauryllactam, N-(N'-phenyl carbamoyl)-caprolactam, N-(N'-phenyl carbamoyl) - lauryllactam, hexamethylene-1,6-bis-(carbamido-caprolactam), hexamethylene-1,6-bis-(carbamido-lauryllactam), phenyl isocyanate, hexamethylene-1,6-diisocyanate, triphenyl cyanurate, dicyclohexyl carbodiimide or benzoic acid anhydride.

5. The composition of claim 1 wherein said lactam has 9 to 18 carbon atoms.

6. The composition of claim 5 wherein said lactam is selected from the group consisting of capric lactam, undecyl lactam and lauryl lactam.

7. The composition of claim 6 wherein said lactam is lauryl lactam.

8. A polymerizable composition of lactam-catalyst-cocatalyst consisting essentially of a mixture of:

(a) a particulate lactam;

(b) a particulate latent catalyst consisting essentially of neutral or weakly basic alkaline earth or alkali metal compounds which react with lactams to form metal lactamates at the polymerization temperature wherein said latent catalyst is a member of the group consisting of

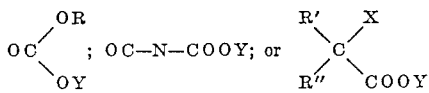

wherein Y is an alkali metal or an alkaline earth metal; X is aryl, cyano or —COOR; R is alkyl; and R' and R" are hydrogen, alkyl or aryl; and (c) a particulate lactam cocatalyst.

9. The composition of claim 8 wherein said catalyst comprises alkali salts of carboxylic acids, of the formula

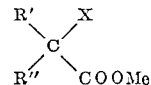     III wherein Me is an alkali metal, R' and R" are selected from the group consisting of alkyl groups, aryl groups, and hydrogen and X is selected from the group consisting of aryl, cyan and ester groups containing 1 to 12 carbon atoms.

References Cited
UNITED STATES PATENTS

| | | | |
|---|---|---|---|
| 3,061,592 | 10/1962 | Schnell et al. | 260—78 |
| 3,086,962 | 4/1963 | Mottus et al. | 260—78 |
| 3,216,976 | 11/1965 | Schwartz | 260—78 |
| 3,220,983 | 11/1965 | Schmidt et al. | 260—78 |
| 3,309,343 | 3/1967 | Darnell et al. | 260—78 |

FOREIGN PATENTS 1,322,685   2/1963   France.

HAROLD D. ANDERSON, Primary Examiner

U.S. Cl. X.R.

252—188.3